United States Patent [19]
Shimizu et al.

[11] 3,853,597
[45] Dec. 10, 1974

[54] PROCESS FOR FORMATION OF SHOCK ALLEVIATING COATING

[75] Inventors: Shozo Shimizu, Okazaki; Hiroshi Shinohara; Junichi Asai, both of Toyota; Takashi Aiki, Yokohama; Kuniomi Hirota, Kamakura; Toashi Kishi, Yokohama, all of Japan

[73] Assignees: Toyota Jidosha Kogyo Kabushiki Kaisha, Aichi Prefecture; Mitsui Toatsu Chemicals, Inc., Tokyo, both of, Japan

[22] Filed: July 20, 1972

[21] Appl. No.: 273,463

[30] Foreign Application Priority Data
Aug. 9, 1971 Japan.............................. 46-59596

[52] U.S. Cl................. 117/75, 117/72, 117/104 R, 148/6.15 Z
[51] Int. Cl......................... B44d 1/14, B32b 15/08
[58] Field of Search..................... 117/72, 104 R, 75

[56] References Cited
UNITED STATES PATENTS 3,244,673  4/1966  Bruin et al. ................. 117/104 R X
3,549,407  12/1970 Williamson ................. 117/104 R X
3,653,950  4/1972  Bonsignore .......................... 117/72

FOREIGN PATENTS OR APPLICATIONS
1,161,806  8/1969  Great Britain........................ 117/75

Primary Examiner—Ralph Husack
Attorney, Agent, or Firm—Wenderoth, Lind & Ponack

[57] ABSTRACT

A process for the formation of a shock alleviating coating on an article comprising covering the surface of the article with a layer of a two-part paint and then spraying a finishing paint on the first layer. The two-part paint consists of a first constituent consisting essentially of an urethane resin containing an excess of isocyanate groups and a second constituent consisting essentially of at least one diamine compound selected from the group consisting of hexamethylenediamine, phenylendiamine, 4,4'-diamino-diphenylmethane, 4,4'-diamino-diphenylsulfone, 4,4'-diamino-diphenylether, 4,4'-diamino-dicyclohexylmethane, 4,-4'-diamino-dicyclohexylsulfone, and 4,4'-diamino-dicyclohexylether, and if desired, resin(s) other than the urethane resin. An epoxy resin is contained in at least one of these constituents.

2 Claims, 4 Drawing Figures

PROCESS FOR FORMATION OF SHOCK ALLEVIATING COATING

BACKGROUND OF THE INVENTION

This invention relates to a process for the formation of a shock absorbing or alleviating protective coating suitable for application to automotive vehicles and the like.

DESCRIPTION OF THE PRIOR ART

Scaling, chipping and other undesirable damage to the vehicle body coating are increasing more and more with the increase in the number of automotive vehicles due to accidental collision or contact between vehicles or due to stones striking against the body of vehicles running on an unpaved road.

It is known, for example, in British Pat. No. 1,161,806 that an elastic coating, which is prepared by dissolving an elastic material such as an urethane resin or elastomer in a solvent and applied to the vehicle body or the like, can sufficiently absorb an external shock or pressure imparted to the vehicle body thereby reducing such undesirable damage to the vehicle body.

However, due to the fact that these elastic materials are poorly adhesive to the vehicle body, it is customary to employ a method in which a film of a primer or adhesive is interposed between the shock absorbing or alleviating film and the vehicle body as shown in FIG. 1. Describing in more detail with reference to FIG. 1, the known method above described comprises applying a conventional primer layer 2 to the vehicle body 1 to be painted, covering the primer layer 2 with a shock alleviating film 3, and then providing a finishing paint layer 4 on the shock alleviating film 3.

When a shock is imparted to the shock alleviating coating provided by the known method, compression occurs in the portion of the shock alleviating coating subjected to the shock as seen in FIG. 2. As a result, the shock alleviating film is stretched excessively at the portion underlying the finishing paint layer in the vicinity of the shock point. The manner of stretching of the shock alleviating film is such that the film is stretched less at a lower portion nearer to the primer layer than at an upper portion, and a strain is produced therein due to the difference between the degrees of stretching. This strain appears in the form of a circle which has a certain radius around the shock point. In order to alleviate this strain, the physical bond between the primer layer and the vehicle body or between the shock alleviating film and the primer layer is completely lost or deteriorated, resulting in such a defect that the shock alleviating coating lifts in the area which is concentric with the shock point. The magnitude and degree of such concentric lifting are dependent upon the modulus of elasticity, thickness, elongation and adhesion of the shock alleviating film.

When a vehicle applied with such a coating is driving on a gravel road, stones will strike against the coating one after another and finally undesirable scaling or chipping may occur on the coating covering the vehicle body. A known publication, for example, a magazine entitled "Paint and Varnish Production" Vol. 60, No. 11, page 48 (1970) discloses a method in which an adhesive is first applied in lieu of the primer for the purpose of improving the adhesiveness and obviating these defects. However, this method has a practical defect in that the adhesive layer has a poor ability to evade corrosion and deterioration in the adhesiveness proceeds at an excessive rate once the film is scratched or otherwise injured. According to this method, the adhesive is diluted by a solvent and sprayed on a vehicle body and then a shock alleviating film of substantial thickness is applied on the adhesive layer. Thus, this method has another practical defect in that the solvent in the adhesive layer is not sufficiently vaporized and the desired adhesiveness cannot be maintained over a long period of time due to the presence of the residual solvent in the adhesive layer.

SUMMARY OF THE INVENTION

It is a primary object of the present invention to provide a novel and improved shock alleviating coating which is free from prior art defects as above described and is substantially maintained in intimate bond with a body even when a shock is imparted thereto.

Another object of the present invention is to provide a shock alleviating paint which can be satisfactorily applied to a body without requiring a primer layer due to the fact that an adhesion improving material is previously contained therein, thereby greatly reducing the time and cost required for painting.

A further object of the present invention is to obviate the prior art defects including the insufficient curing of the reactive shock alleviating paint or deficiency of adhesiveness due to vaporization of the solvent contained in the underlying primer layer.

In accordance with the present invention, there is provided a process for the formation of a shock alleviating protective coating on a shaped article of metal or synthetic resin material which comprises preparing a two-part paint consisting of a first constituent consisting essentially of resin containing an excess of isocyanate groups therein and a second constituent consisting essentially of at least one diamine compound selected from the group consisting of hexamethylene-diamine, phenylendiamine, 4,4'-diamino-diphenyl-methane, 4,4'-diamino-diphenylsulfone, 4,4'-diamino-diphenylether, 4,4'-diamino-dicyclohexyl-methane, 4,4'-diamino-dicyclohexyl-sulfone, and 4,4'-diamino-dicyclohexylether, and, if desired, resin(s) other than the urethane resin, with the proviso that at least one of said constituents further contains an effective amount of an epoxy resin therein, spraying said two-part paint directly on the surface of said article with a spray gun means adapted for the spraying of such a paint thereby providing a first layer on said surface, and then applying a weather-proof paint on said first layer thereby providing a second or a finishing layer on said first layer.

DESCRIPTION OF THE PREFERRED EMBODIMENTS

Figure 1:
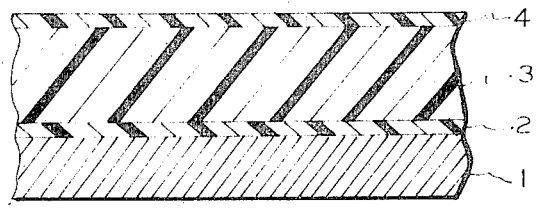
FIG. 1 is a schematic section of a shock alleviating coating formed by a prior art process.
Figure 2:
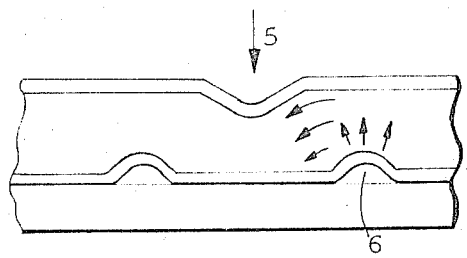
FIG. 2 is a view similar to FIG. 1, but showing the state of the shock alleviating coating when an external shock is imparted thereto.
Figure 3:
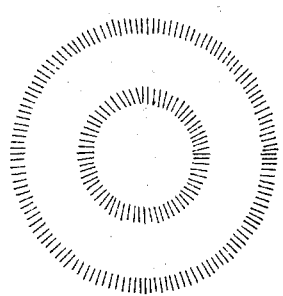
FIG. 3 is a schematic view illustrating the manner of blistering of the shock alleviating coating occurring in the vicinity of the shock point after the external shock has been applied.
Figure 4:
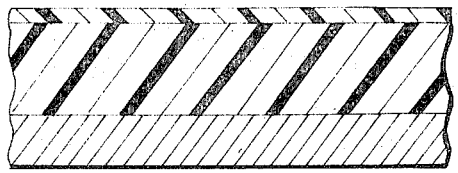
FIG. 4 is a schematic section of a shock alleviating coating formed by a process according to the present invention.

The present invention is applicable to an article of metal material such as iron, copper, zinc, aluminum, chromium or nickel, or an article which is surface-treated with anyone of these metal materials. The present invention is further applicable to an article of plastic material such as a polyester resin, polycarbonate resin, polyvinyl chloride resin or ABS resin. Such an article is first subjected to a surface defatting treatment with an aqueous solution of an alkali or an organic solvent, and then, in the case of a metallic article, it is subjected to a surface treatment with a phosphate or chromic acid depending on the metal material. When, for example, the article is of iron or zinc, surface treatment with phosphate is suitable and the amount of the thin film thereby formed is preferably of the order of 0.5 to 3 $g/m^2$ of the surface area. After such a pre-treatment, a two-part type spray gun is used to coat the surface of the article with a two-part paint which comprises a first constituent consisting essentially of an urethane resin therein, and a second constituent consisting essentially of at least one diamine compound selected from the group consisting of hexamethylene-diamine, phenylendiamine, 4,4'-diamino-diphenylmethane, 4,4'-diamino-diphenylsulfone, 4,4'-diamino-diphenylether, 4,4'-diamino-dicyclohexylmethane, 4,4'-diamino-dicyclohexylsulfone, and 4,4'-diamino-dicyclohexylether, and, if desired, resin(s) other than the urethane resin, with the proviso that at least one of said constituents further contains an effective amount of an epoxy resin for improving the adhesion of the paint.

A curing reaction takes place immediately in the paint as soon as the paint is applied to the article, and any defects such as "sagging" and "running" do not occur during the application of the paint. It is thus possible to obtain a paint film having a large thickness. This paint film acts as a shock absorbing or alleviating means due to the fact that it has a large thickness and includes the urethane resin and other elastic materials therein. After the shock alleviating paint film has been applied, heat may be applied as required so as to promote the curing reaction and to vaporize the solvent which may remain in a small amount in the film. Subsequently, a conventional finishing paint is applied and then the coating is dried to complete the process.

The urethane resin and epoxy resin are essential for the shock alleviating paint used in the present invention for forming the shock alleviating film of substantial thickness. In addition to the epoxy resin, further modifier such as an acrylic resin, vinyl chloride resin, vinyl acetate resin, polyester resin or alkyd resin may also be used. Effective modifiers preferably used for the present purpose are those which include a functional group such as a cyano group (—CN), ester group (—COOR), hydroxyl group (—OH) or carboxyl group (—COOH) in the side chain of the resin structure.

The urethane resins are, for example, urethane prepolymers prepared by reacting (a) a polyester of a carboxylic acid, polyhydroxyalcohol, polyester amide, polyether and polyacetal or a mixture thereof as well as the corresponding copolymer having a molecular weight of 200 to 10,000, preferably 500 to 4,000, with (b) an excess amount of a diisocyanate, which urethane prepolymers include generally from 1 to 20 percent by weight of active isocyanate groups.

The epoxy resins may be ones which are obtained from bisphenol A or a polyether and epichlorohydrin, for example Epikote manufactured by Shell Chemical Corporation or DER manufactured by Dow Chemical Company. Cyclo-epoxy resins such as Chissonox manufactured by Chisso Company in Japan as well as vegetable oil-epoxides may also be used. In the present invention, the epoxy resin of the kind above described may be used in various methods including a method in which such epoxy resin is merely blended with the urethane resin, a method in which such epoxy resin is copolymerized with the urethane resin as a component of a polyol, and a method in which an amine adduct-epoxide which is obtained by reacting the epoxy group in the epoxide with an amine is used as a curing agent. The desired adhesiveness can also be attained by blending other resin material such as an acrylic resin, vinly chloride resin, vinyl acetate resin or polyester resin in the composition above described.

The curing agent may be anyone of diamines selected from the group consisting of hexamethylene-diamine, phenylendiamine, 4,4'-diamino-diphenylmethane, 4,4'-diamino-diphenylsulfone, 4,4'-diamino-diphenylether, 4,4'-diamino-dicyclohexyl-methane, 4,4'-diamino-dicyclohexylsulfone, and 4,4'-diamino-dicyclohexylether. Further, the curing agent may be anyone of mixtures of these materials.

Non-yellowing urethane paints are most suitable for use as the top coating. However, any other urethane paints, rubber paints, acrylic resin paints, vinyl chloride resin paints or aminoalkyd paints may also be used.

While the present invention is most effective for application to the painting of the body plates, bumpers and wheel caps of vehicles, its outstanding effect can be maintained over an extended period of time even when applied to the painting of the guard rails on the road, bridges, fences, etc.

Some examples of the present invention will now be described in detail.

EXAMPLE 1

An iron plate having a size of 70 mm × 150 mm was first covered with a thin film of zinc phosphate in an amount of 1 to 2 grams per square meter of the surface area. 100 Parts of urethane resin (Olester XQ— 2309 LP manufactured by Mitsui-Toatsu Chemicals, Incorporated) consisting of polypropylene glycol and toluene diisocyanate and containing 6.2 percent by weight of active isocyanate groups therein were diluted with 25 parts of toluene to prepare a first constituent. A second constituent was separately prepared, which consisted of 5 parts of epoxy resin (Epikote 1001 manufactured by Shell Chemical Corporation), 49 parts of 27 percent by weight of ethyl acetate solution of 4,4'-diamino-diphenylmethane and 58 parts of methyl isobutyl ketone. The first and second constituents above described were supplied at a volume ration of 1 : 1 into a proportioning forced-feed spray apparatus (Formulator G of Binks Manufacturing Company), and after thoroughly mixed therin, the resulting paint was sprayed on the iron plate at a pressure of 60 to 100 $kg/cm^2$. The paint was successively applied eight times at suitable time intervals and was then let to set for about 10 minutes. The iron plate was then placed in a drying furnace to be dried for 60 minutes at 100°C. The iron plate painted in this manner was covered with a shock alleviating film about 500 $\mu$ thick. A two-part urethane coloring paint such as finishing enamel containing a non-yellowing isocyanate component was then sprayed on the shock alleviating film covering the iron plate in such an amount that will give a dry film thickness of 40 to 50 μ. The coloring paint thus applied was let to set for 10 minutes, and the iron plate was then dried for 60 minutes at 110°C. The external appearance of the coating thus obtained was equivalent in luster and gloss to conventional coatings commonly applied to the body plates of vehicles. The coating had a suitable degree of elasticity and was highly resistant to shock and chipping as follows:

| Properties | Test conditions | Test results |
|---|---|---|
| Impact resistance (JIS K5400) | Load 1 kg, hammer dia. ½"φ, drop stroke 50cm | Any cracks, chipping breakage and lifting were not observed on the coating including the portion around the point of impact impartation. |
| Chip resistance (SAE J400)* | Nozzle-to-panel distance 20cm, amount of gravel 2 kg | Any cracks extending to the base as well as any chipping were not observed. Further, any lifting of the coating off the base was not observed. |

* "1971 SAE Hand Book" pp. 300–304, published by Society of Automotive Engineers, Inc.

The remarkly excellent impact resistance of the coating compared with that of conventional vehicle body coatings was still retained even after an ultraviolet radiation test (by the use of a Weather-O-meter) over 400 hours and after a warm water immersion test at 40°C. over 240 hours. This property was also retained sufficiently even at an extremely low temperature of −10°C.

EXAMPLE 2

An aluminum plate having a size of (70 mm × 150 mm) was subjected to a defatting treatment with an alkali and then to a surface treatment with a chromate. A paint was prepared, which consisted of a first constituent as described in EXAMPLE 1, and a second constituent consisting of 30 parts of epoxy resin (DER 732 manufactured by Dow Chemical Company), 61 parts of 27 percent by weight of ethyl acetate solution of 4,4'-diamino-diphenylether and 46 parts of methyl ethyl ketone. This paint was sprayed on the aluminum plate in the same manner as described in EXAMPLE 1, and a finishing paint was then applied to the shock alleviating film covering the aluminum plate. The coating thus obtained showed a good external appearance and good impact resistance comparable to thos described in EXAMPLE 1.

EXAMPLE 3

An iron plate having a size of (70 mm × 150 mm) was subjected to a defatting treatment and was then covered with a thin film of iron phosphate in an amount of 0.3 to 1.0 gram per square meter of the surface area. 100 parts of epoxy-modified urethane resin (Olester-XQ-2309 LP-3 manufactured by Mitsui-Toatsu Chemicals, Incorporated) consisting of polyneopentyl adipate, Epikote 1001 and toluene diisocyanate and containing 5.9 percent by weight of active isocyanate groups therein was diluted with 43 parts of a 1 : 1 mixture of toluene and ethyl acetate to prepare a first constituent. A second constituent was separately prepared, which consisted of 47 parts of 27 percent by weight of ethyl acetate solution of 4,4'-diamino-diphenylsulfone and 96 parts of methyl isobutyl ketone. The paint consisting of the first and second constituents above descirbed was sprayed on the aluminum plate in the manner described in EXAMPLE 1, and then a finishing paint was similarly applied to the shock alleviating film covering the aluminum plate.

The coating thus obtained showed good impact resistance and chip resistance, similar to those described in EXAMPLE 1. Any cracks and chipping did not occur on the coating and any reduction in the adhesion was not observed when the aluminum plate covered with the above coating was subjected to a bending test (4 mm φ) as specified in JIS (Japanese Industrial Standard) K5400.

EXAMPLE 4

The surface of a vehicle wheel cap molded from a fiberglass reinforced plastic was thoroughly cleaned with a gauze impregnated with a 1 : 1 mixture of isopropyl alcohol and petroleum naphtha. 100 parts of an epoxymodified urethane resin as described in EXAMPLE 3 was diluted with 43 parts of toluene to prepare a first constituent. A second constituent was separately prepared, which consisted of 37 parts of 27 percent by weight of ethyl acetate solution of 4,4'-diamino-diphenylmethane, 30 parts of polyester resin solution containing 80% by weight of solid component and having a hydroxyl value of 60, and 62 parts of methyl isobutyl ketone. The paint consisting of the first and second constituents above described was sprayed on the wheel cap in the manner described in EXAMPLE 1, and then a finishing paint was similarly applied to the resulting shock alleviating film covering the wheel cap. Drying steps were then carried out under the same conditions as EXAMPLE 1 without being restricted in any way by the material forming the wheel cap. The coating thus obtained could sufficiently withstand the shock imparted by stones impinging thereagainst during driving of the vehicle by virtue of its excellent impact resistance.

EXAMPLE 5

An iron plate having a size 70 mm × 150 mm was first covered with a thin film of zinc phosphate in an amount of 2 to 3 g/m² of the surface area. 100 Parts of urethane resin as described in EXAMPLE 3 were diluted with 25 parts of toluene to prepare a first constituent. A second constituent was separately prepared, which consisted of 52 parts of 27 percent by weight of ethyl acetate solution of 4,4'4'-diamino-diphenylmethane, 6 parts of vinyl chloride resin (VMCH manufactured by Union Carbide Corporation) and 54 parts of methyl isobutyl ketone. The paint consisting of the first and second constituents above described was sprayed on the iron plate in the manner described in EXAMPLE 1, and then a finishing paint was similarly applied to the resulting shock alleviating film covering the iron plate. The coating thus obtained showed excellent impact resistance, similar to that described in EXAMPLE 1.

EXAMPLE 6

A press-worked vehicle bumper of iron was first covered with a thin film of zinc phosphate in an amount of 1 to 3 g/m$^2$ of the surface area. A paint consisting of a first and a second constituent as described in EXAMPLE 1 was sprayed on the bumper fifteen times, and the bumper was then dried for 1.5 hours at 100°C to obtain thereon a shock alleviating film about 0.9 to 1.0 mm thick. The surface of the shock alleviating film was then lightly polished with a No. 150 silicon carbide paper, and after thus smoothening the surface of the shock alleviating film, a finishing paint as described in EXAMPLE 1 was applied to the shock alleviating film covering the bumper. The coating thus obtained showed a remarkably excellent impact resistance, and adhesiveness and was free from any damage even after a 20,000-Km endurance running test on an unpaved road and after a conventional running test over 6 months.

EXAMPLE 7

An iron plate having a size of 70 mm × 150 mm was first covered with a thin film of zinc phosphate in an amount of 2 to 3 g/m$^2$ of the surface area by a zinc phosphate surface treatment. 100 Parts of an urethane resin as described in EXAMPLE 1 were diluted with 25 parts of toluene to prepare a first constituent. an amine adduct-epoxide was obtained by causing 13 parts of 4,4'-diamino-diphenylmethane to react with 5 parts of epoxy resin (Epikote 1001 described in EXAMPLE 1), and this amine adduct-epoxide was dissolved in a solution consisting of 20 parts of N-methyl-2-pyrrolidone, 29 parts of ethyl acetate and 58 parts of methyl isobutyl ketone, thereby preparing a second constituent. The paint consisting of the first and second constituents above described was sprayed on the iron plate in the manner described in EXAMPLE 1, and then a finishing paint was similarly applied to the shock alleviating film covering the iron plate. The coating thus obtained showed an excellent impact resistance similar to that described in EXAMPLE 1.

The examples above described have referred to the case in which the paint includes solely the resin compositions. However, it will be apparent to those skilled in the art that the paint may further include other agents including a filling agent, reinforcing agent, extending agent and coloring agent such as carbon black, red oxide of iron, titanium white, chrome yellow and lithopone.

We claim:

1. A process for the formation of a shock alleviating protective coating on a shaped article of metal or synthetic resin material which comprises preparing a two-part paint consisting of a first constituent consisting essentially of a urethane resin containing an excess of isocyanate groups and a second constituent consisting essentially of at least one diamine compound selected from the group consisting of hexamethylene-diamine, phenylendiamine, 4,4'-diamino-diphenylmethane, 4,4'-diamino-diphenylsulfone, 4,4'-diamino-diphenylether, 4,4'-diamino-dicyclohexylmethane, 4,4'-diamino-dicyclohexylsulfone, and 4,4'-diamino-dicyclohexylether, and, with or without one or more resins other than the urethane resin, with the proviso that at least one of said constituents further contains an amount of an epoxy resin therein effective to promote formation of a shock alleviating protective coating, spraying said two-part paint directly on the surface of said article with a spraying means adapted for the spraying of such paint thereby providing a first layer on said surface, and then applying a weather-proof paint on said first layer thereby providing a second or a finishing layer on said first layer.

2. A process as claimed in claim 1, in which said second consitituent of the two-part paint includes one or more resins selected from the group consisting of acrylic resins, vinyl chloride resins, vinyl acetate resins and polyester resins.

* * * * *